(No Model.)
M. W. HASSAN.
SURGICAL INSTRUMENT
No. 321,721. Patented July 7, 1885.
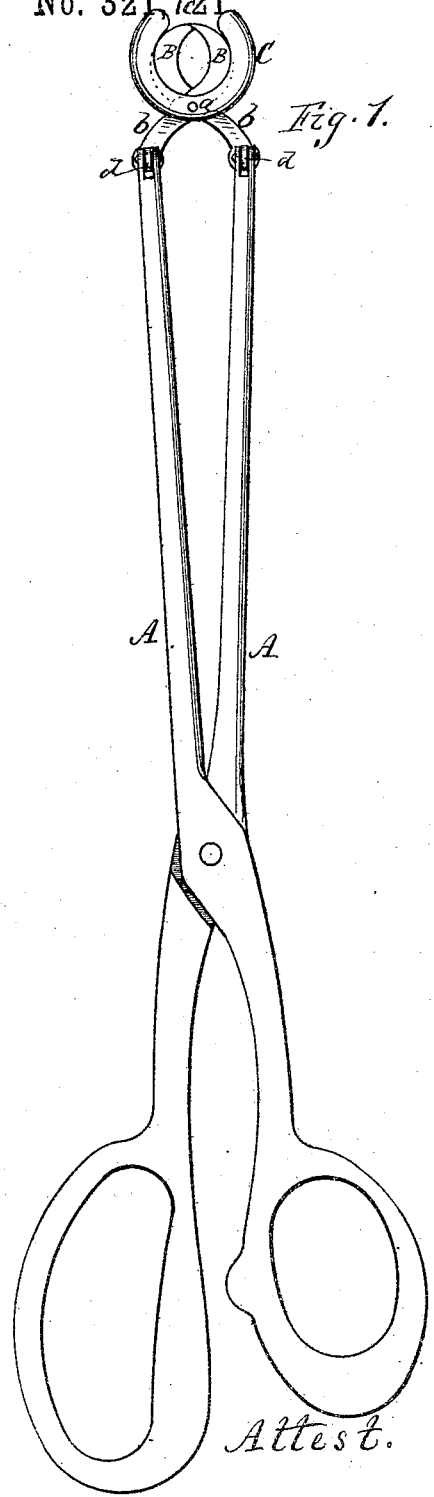
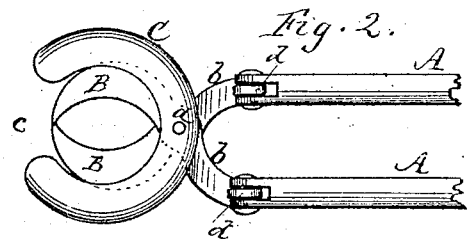
Fig. 2.
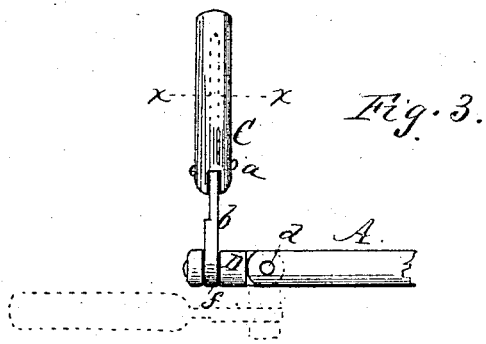
Fig. 3.
Fig. 4.
Attest.
M. E. Furlong.
E. E. Staring.
Inventor.
Medbury W. Hassan
R. F. Osgood,
Atty

UNITED STATES PATENT OFFICE.

MIDBURY W. HASSAN, OF ROCHESTER, NEW YORK.

SURGICAL INSTRUMENT.

SPECIFICATION forming part of Letters Patent No. 321,721, dated July 7, 1885

Application filed May 19, 1885. (No model.)

*To all whom it may concern:*

Be it known that I, MIDBURY W. HASSAN, of the city of Rochester, in the county of Monroe and State of New York, have invented a certain new and useful Improvement in Surgical Instruments; and I do hereby declare that the following is a full, clear, and exact description of the same, reference being had to the accompanying drawings, in which—

Figure 1 is a plan view of the instrument. Fig. 2 is a similar view of the operating portion of the same on an enlarged scale. Fig. 3 is a side elevation of Fig. 2, but with the shield and cutters turned up at right angles to the shank. Fig. 4 is a cross-section of one side of the shield in line $x$ $x$ of Fig. 3, and on an enlarged scale.

My improvement relates to surgical instruments for removing tumors, polypus, enlarged tonsils, &c., by cutting at the base.

The invention consists in the combination of a pair of cutters pivoted to cut toward and past each other, an inclosing-shield turning freely on the same pivot and guarding the cutters, and a system of levers and connections, by which the cutters and shield can be set at any position from horizontal to vertical, as hereinafter described.

In the drawings, A A show a pair of levers like those of shears, crossing each other and pivoted at the crossing, and having finger-loops, by which they are operated.

My improvement is as follows: B B are two curved cutting-blades, pivoted at $a$, and provided with shanks $b$ $b$, arranged to close together and do the cutting when the shanks are closed. The cutting-edges are made to cut past each other, and the concave is such as to take in the object to be cut when the blades are expanded.

C is a shield consisting of a ring with an opening, $c$, in front, also of such size as to take in the object to be cut. This shield is concave in cross-section, forming an inclosing-shell, as shown in the cross-section, Fig. 4. This shield is attached to the cutting-blades by the same pivot, $a$, that pivots the blades together, and the shield has freedom of motion around this pivot, and therefore is not controlled by the blades. The blades, when expanded or thrown open, pass back into the hollow of the shield and leave the latter unobstructed to receive the object to be cut; but when the blades are closed they meet in the center of the shield and cut off the obstruction.

D D are two short toggle-arms, pivoted at $d$ $d$ to the main arms A A, so as to turn up and down vertically. The ends of the shanks $b$ $b$ of the cutters are pivoted at $f$ $f$ to the outer ends of the toggle-arms, so as to turn thereon at right angles to the length of the instrument.

By the means above described it will be seen that the shield and cutters can be used in the horizontal position shown in Figs. 1 and 2, or in the vertical form shown in Fig. 3, or in any intermediate position included in the right angle, since the effect of operating the levers A A in any of these positions will open and close the cutters without trouble. Therefore the instrument can be adjusted to different positions, which is important in operating in difficult places.

I do not wish to confine myself to the use of the levers A A, as other means can be used to accomplish the same purpose.

By the use of a shield, as described, the blades are guarded and protected, and they are prevented from coming in contact with the parts where the instrument is inserted, and the shield, being smooth and of convex form, will do no injury. This shield by its free movement on the pivot also acts as a guide in receiving the enlargement to be cut away. The jointed connections described are essential to enable the cutters to be worked at any angle at which they are set.

Having described my invention, what I claim as new, and desire to secure by Letters Patent, is—

1. In a surgical instrument for removing abnormal growths, the combination, with the cutters B B, of the inclosing-shield C, turning freely on the same pivot that connects the cutters, said shield being open in front and constructed in concave form in cross-section, as shown and described, and for the purpose specified.

2. In a surgical instrument for removing abnormal growths, the combination of the cutters B B, the shield C, turning freely on the same pivot with the cutters, and the toggle-arms D D, to which the shanks of the cutters are pivoted, said arms being pivoted to the operating-levers, in the manner and for the purpose specified.

In witness whereof I have hereunto signed my name in the presence of two subscribing witnesses.

M. W. HASSAN.

Witnesses:
R. F. OSGOOD,
P. A. COSTICH.